United States Patent [19]

Boden et al.

[11] 3,872,033

[45] Mar. 18, 1975

[54] FOAMED REACTION PRODUCT OF A RESALE WITH A SULFONATED NOVOLAC

[75] Inventors: Philip Boden, Aberdeen, Scotland; Peter John Crook, Wallasey, England; Michael Edgar Hall, Warrington, England; Stephen Philip Riley, Prescot, England

[73] Assignee: Fibreglass Limited, Liverpool, England

[22] Filed: Nov. 16, 1972

[21] Appl. No.: 307,267

Related U.S. Application Data

[62] Division of Ser. No. 123,851, March 12, 1971, abandoned.

[30] Foreign Application Priority Data

Mar. 13, 1970 United Kingdom............12311/70

[52] U.S. Cl............. 260/2.5 F, 260/49, 260/57 A, 260/838
[51] Int. Cl........................ C08g 53/08, C08j 1/26
[58] Field of Search ........................ 260/2.5 F, 838

[56] References Cited

UNITED STATES PATENTS

| | | | |
|---|---|---|---|
| 2,179,038 | 11/1939 | Guthke............................... | 260/838 |
| 3,207,652 | 9/1965 | Shannon............................ | 260/2.5 F |
| 3,389,094 | 6/1968 | D'Alesandro...................... | 260/2.5 F |
| 3,511,789 | 5/1970 | Shannon et al................... | 260/2.5 F |

*Primary Examiner*—Morton Foelak
*Attorney, Agent, or Firm*—Sughrue, Rothwell, Mion, Zinn & Macpeak

[57] ABSTRACT

This invention provides a new phenol-formaldehyde resin particularly suitable for the production of a solid resin foam. A phenol-formaldehyde resole is hardened using an acidic composition produced by reacting a phenol with concentrated sulphuric acid and then adding formaldehyde. One part by weight of the sulphonated composition is reacted with from 0.1 to 8 parts by weight of the resole. For foam production a surfactant and foaming agent are mixed together with the sulphonated composition and the resole.

6 Claims, No Drawings

A FOAMED REACTION PRODUCT OF A RESALE WITH A SULFONATED NOVOLAC

This is a Division of application Ser. No. 123,851, filed Mar. 12, 1971, now abandoned.

BACKGROUND OF THE INVENTION

1. Field of the Invention

This invention relates to insulating materials and more especially to phenol-formaldehyde resin, suitable for example for use in the production of phenolformaldehyde resin foams.

2. Description of the Prior Art

Phenolic resinous condensation products and more specifically resins of the resole type obtained by condensation of phenol and formaldehyde in the presence of an alkali catalyst have been used for phenolic foam production and additives such as dicyandiamide, urea or melamine have been used in such foams to provide a source of nitrogen within the foam and thereby increase the flame resistance of the foam.

The curing of the resole to produce the foam is usually carried out using an organic acid such as benzene sulphonic acid, toluene sulphonic acid or phenol sulphonic acid and to the mixture being polymerised there has been added a surfactant and a foaming agent.

Difficulties have been experienced in producing uniformity in the foam structure because of the disparity between the viscosity of the hardening agent which is the acid and the resole which is usually a viscous liquid. For some applications phenol-formaldehyde resin foams of this kind have been found not to have adequate resistance to flame penetration or to spread of flame.

It is a main object of the present invention to provide an improved phenol-formaldehyde resin of homogeneous structure and this is achieved by employing a hardening agent whose viscosity is of the same order as that of the resole and which can copolymerise with the resole and be incorporated into the final resin structure.

A further object is to provide a phenol-formaldehyde resin in which the molecular proportions of a phenol to formaldehyde are adjusted in the final resin by the introduction of a phenol and formaldehyde in the hardener.

SUMMARY

The invention provides a phenol-formaldehyde resin which is particularly suitable for the production of phenol-formaldehyde resin foam. A phenol-formaldehyde resole is produced by reacting a phenol and formaldehyde in the ratio of at least 0.9 moles of formaldehyde per mole of the phenol in the presence of a basic catalyst. Then a sulphonated composition is produced by reacting a phenol with concentrated sulphuric acid in the ratio 0.8 to 1.5 moles of sulphuric acid per mole of the phenol, and then adding per mole of the phenol a quantity of formaldehyde in the range having a lower limit of 0.3 moles and an upper limit of 0.8 moles when using 0.8 moles of sulphuric acid and decreasing to 0.5 moles when using 1.5 moles of sulphuric acid.

One part by weight of the sulphonated composition is reacted with from 0.1 to 8 parts by weight of the resole to produce the phenol-formaldehyde resin.

The sulphonated phenol-formaldehyde composition acts as hardener for the resole. Sulphonated phenol-formaldehyde composition containing less than 0.5 moles of formaldehyde per mole of the phenol may contain some uncondensed phenol sulphonic acid but can still be employed in the resin preparation. Excess sulphuric acid can be removed by reaction with a neutralising inorganic substance.

In the resole it is preferred to have an excess of formaldehyde to phenol in order to reduce the possibility of free phenol remaining in the ultimate resin.

For the production of a phenol-formaldehyde resin in the form of a solid foam the sulphonated composition is reacted with the resole in the presence of a surfactant and a foaming agent.

DESCRIPTION OF THE PREFERRED EMBODIMENTS

The invention is particularly suitable for production of new phenol-formaldehyde resin foams produced by copolymerisation of a phenol-formaldehyde resole with a sulphonated phenol-formaldehyde composition both of which constituents of the foam are brought to substantially the same viscosity and then mixed with a surfactant such as a silicone oil and a foaming agent. The copolymerisation reaction is exothermic and the heat generated causes the copolymerisation to proceed and at the same time activates the foaming agent whose proportion in the mixture is such that a foam of desired density is produced by the time the copolymerisation is completed and the foam is solid.

The two polymers are separately produced and the phenol-formaldehyde resole is a resole having an excess of formaldehyde to phenol which thereby ensures that a highly crosslinked polymer is formed where rigid foams are desired.

Foam rigidity can be reduced by increasing the proportion of sulphonated phenolic composition and can be increased by crosslinking, for example by addition of a donor of methylene groups, for example hexamethylene tetramine.

The resole resins set out in Table I are examples of the type of formaldehyde-rich resoles which are used as one of the resins for producing the phenolformaldehyde resin foam.

TABLE I

| Resole | Phenol (moles) | Other Phenolic Constituent (moles) | Formaldehyde (37% in $H_2O$) (moles) | Catalyst (moles) | Additive (moles) |
| --- | --- | --- | --- | --- | --- |
| R1 | 1 | — | 2.4 | $Ba(OH)_2.8H_2O$ 0.05 | — |
| R2 | 1 | — | 2.6 | $Ba(OH_2.8H_2O$ 0.07 | Melamine 0.2 |
| R3 | 1 | — | 2.3 | $Ba(OH)_2.8H_2O$ 0.06 | Urea 0.25 |
| R4 | 1 | — | 2.5 | $Ba(OH)_2.8H_2O$ 0.06 | Dicyandiamide 0.1 |

TABLE I—Continued

| Resole | Phenol (moles) | Other Phenolic Constituent (moles) | Formaldehyde (37% in H$_2$O) (moles) | Catalyst (moles) | Additive (moles) |
|---|---|---|---|---|---|
| R5 | 1 | — | 1.7 | NaOH 0.03 | — |
| R6 | 1 | — | 1.9 | Triethylamine 0.06 | — |
| R7 | 1 | — | 2 | NaOH 0.05 | Urea 0.2 |
| R8 | 1 | — | 2.1 | Triethylamine 0.06 | Melamine 0.1 |
| R9 | 1 | m-cresol 0.5 | 3.7 | Ba(OH)$_2$.8H$_2$O 0.06 | — |
| R10 | 1 | p-cresol 0.5 | 3.7 | Ba(OH)$_2$.8H$_2$O 0.06 | — |
| R11 | 1 | hydro-quinone 0.1 | 2.6 | Ba(OH)$_2$.8H$_2$O 0.06 | — |

For each of the resoles R1 to R11 the phenolic constituents and formaldehyde, which was added as a 37 percent aqueous solution, and the catalyst were mixed and heated first for 2 hours at 40°C to 45°C and then for 2 hours at 60°C to 65°C and finally for 1½ hours at 70°C to 75°C. The mixture was agitated constantly throughout the heating.

After cooling to room temperature the mixture was neutralised to about pH7 using sulphuric acid (specific gravity 1.25). Any additive which was required in the resole, for example urea, melamine or dicyandiamide, as set out in Table I, was added after the first 4 hours of reaction, that is before the final stage of reaction at 75°C. Usually a proportion of the additive of from 0.1 to 0.3 moles per mole of phenol was employed. A proportion of polyethylene glycol or polypropylene glycol up to 20% by weight may be added if desired.

After the neutralisation step the resole was usually concentrated under vacuum to about 70 percent to 80 percent solids content and to a desired viscosity in the range 1 to 25 poises and usually in the range 8 to 15 poises.

The resoles set out in Table I are produced using formalin (37 percent aqueous solution of formaldehyde) as the source of formaldehyde.

Paraformaldehyde, which is a solid polymerised form of formaldehyde can also be used either alone or in conjunction with a proportion of formalin. A range of results so produced using paraformaldehyde is set out in Table II.

TABLE II

| Resole | Phenol (moles) | Formaldehyde (37% in H$_2$O) (moles) | Paraformaldehyde (87% in H$_2$O) (moles) | Catalyst (moles) | Viscosity (poises at 20°C) | Solids Content (weight %) |
|---|---|---|---|---|---|---|
| R12 | 1 | 0.52 | 1.23 | Ba(OH)$_2$.8H$_2$O 0.03 | 4 | 70 |
| R13 | 1 | 0.8 | 1.6 | Ba(OH)$_2$.8H$_2$O 0.02 | 1.4 | 64.2 |
| R14 | 1 | 0.3 | 2.1 | Ba(OH)$_2$.8H$_2$O 0.02 | 12.8 | 71.2 |
| R15 | 1 | 0.48 | 1.92 | Ba(OH)$_2$.8H$_2$O 0.04 | 4.25 | 69.7 |
| R16 | 1 | 0.3 | 2.1 | Ba(OH)$_2$.8H$_2$O 0.04 | 3.85 | 72.5 |
| R17 | 1 | 0.3 | 1.9 | Ba(OH)$_2$.8H$_2$O 0.02 | 3.15 | 74.7 |
| R18 | 1 | 0.2 | 1.8 | Ba(OH)$_2$.8H$_2$O 0.02 | 8.5 | 75.5 |
| R19 | 1 | 0.86 | 97% Paraformaldehyde 1.58 | BA(OH)$_2$.8H$_2$O 0.02 | 1.58 | 64.2 |
| R20 | 1 | 0.24 | 2.2 | Ba(OH)$_2$.8H$_2$O 0.02 | 11.6 | 68.8 |
| R21 | 1 | 0.08 | 2.38 | Ba(OH)$_2$.8H$_2$O 0.02 | 13 | 76 |
| R22 | 1 | 0.08 | 1.62 | Ba(OH)$_2$.8H$_2$O 0.02 | 12 | 68 |
| R23 | 1 | 0.3 | 1.2 | NaOH 0.0125 | 16 | 82 |
| R24 | 1 | — | 1.3 | NaOH 0.0125 | 10 | 77 |
| R25 | 1 | — | 0.96 | NaOH 0.0125 | 18.2 | 77.5 |

Each of the results R12 to R22 were produced by a similar reaction. The heating cycle was 2 hours at 43°C followed by two hours at 60°C concluding with 1½ to 2 hours at 70°C to 75°C. The resole produced was cooled and sulphuric acid (specific gravity 1.25) was added until the resole had pH7. The use of formaldehyde in the more concentrated form of paraformaldehyde meant that each of the resoles had a high solids content and any necessity for an evaporation stage was eliminated. The resoles R12 to R22 were of a satisfactory viscosity as produced.

The viscosity, which depends on the solids content, could however be adjusted by dilution with water if necessary to a value comparable with the viscosity of the sulphonated composition with which the resole was eventually reacted. The viscosity of the sulphonated composition was adjusted to an appropriate value as described below.

Resoles R23, R24 R25 R25 are less reactive and relatively high viscosity resoles produced using paraformaldehyde as the principal source of formaldehyde in the case of R23 and as the only source of formaldehyde as in R24 and R25. The reaction of these less reactive resoles with a specially treated sulphonated composition to regulate the foaming reaction will also be described below.

The water soluble sulphonated phenol-formaldehyde composition forming the other constituent of the ultimate resin and acting as a hardening agent for the resole was separately prepared. Examples of the sulphonated phenol composition SP1 to SP15 are set out in Table III. This Table gives the proportions of phenol and other phenolic constituent, e.g. a cresol or 3:5 xylenol, sulphuric acid, and formaldehyde used, as well as the reaction temperature and the viscosity of the composition produced. The concentrated sulphuric acid was usually added at 98 percent concentration. Composition SP15 was made using 80 percent concentrated sulphuric acid.

range 30°C to 40°C. The reaction with formaldehyde took 1 to 2 hours. Basic neutralising substances could be added at this stage as described below. Finally the water was added to control the viscosity and the viscosity of each of the sulphonated phenol-formaldehyde compositions as shown in Table III lies in the range 2 to 25 poises. The amount of formaldehyde employed does to some extent control the solids content and hence the viscosity of the mixture in the course of the sulphonation reaction. The solids content was generally about 60 percent to 75 percent. The viscosity of the compositions SP1 to SP15 was comparable to the viscosity of the resoles set out in Tables I and II, and appropriate viscosity adjustment was made by dilution or evaporation as necessary.

Some free sulphuric acid remains in the sulphonated composition and this may be partially neutralised by the addition of an inorganic substance, for example solid barium hydroxide, calcium hydroxide, calcium carbonate, sodium bicarbonate or sodium carbonate. For example 15 g of calcium hydroxide were added per 100 g of the sulphonated composition and after stirring the composition was left to stand until a precipitate had settled. If a carbonate was used the composition was left to stand until gassing had ceased.

TABLE III

| Sulphonated Phenol | Phenol (moles) | Other Phenolic Constituent (moles) | Sulphuric Acid (98%) (moles) | Reaction Temperature | Formaldehyde (37% in $H_2O$) (moles) | Water (grammes) | Viscosity (poises) |
|---|---|---|---|---|---|---|---|
| SP1 | 1 | — | 1.1 | 105 – 110°C | 0.6 | 40 | 3.5 |
| SP2 | 1 | — | 0.8 | 125 – 130°C | 0.7 | 40 | 5 |
| SP3 | 1 | — | 0.9 | 150°C | 0.5 | 40 | 4 |
| SP4 | 1 | — | 1 | 125 – 130°C | 0.5 | 40 | 3 |
| SP5 | 1 | — | 1.25 | 105°C | 0.55 | 40 | 5 |
| SP6 | 1 | — | 0.8 | 105 – 110°C | 0.8 | 40 | 7 |
| SP7 | 1 | — | 1.5 | 105 – 110°C | 0.3 | 40 | 2 |
| SP8 | 1 | — | 1.1 | 125°C | 0.4 | 40 | 2.5 |
| SP9 | 1 | — | 1.4 | 105°C | 0.45 | 40 | 4 |
| SP10 | 1 | m-cresol 0.5 | 1.6 | 85 – 90°C | 0.85 | 60 | 6 |
| SP11 | 1 | o-cresol 0.5 | 1.6 | 95 – 100°C | 0.85 | 60 | 6 |
| SP12 | 1 | p-cresol 0.5 | 1.6 | 95 – 100°C | 0.85 | 60 | 6 |
| SP13 | 1 | 3,5 xylenol 0.5 | 1.6 | 110°C | 0.85 | 60 | 7 |
| SP14 | 1 | — | 1 | 110 – 130°C | 0.6 | 20 | 25 |
| SP15 | 1 | — | 80% $H_2SO_4$ 1 | 100 – 120°C | 0.6 | 25 | 24 |

Each of the sulphonated phenol compositions SP1 to SP15 was prepared by melting the phenol, and where appropriate the other phenolic constituent, in the reaction vessel at about 70°C, slowly adding the concentrated sulphuric acid with continuous stirring and then reacting for about 40 minutes with continued stirring. The rate of addition of the sulphuric acid was controlled so that the exothermic heat generated maintained the temperature in the reaction vessel in the range 100°C to 150°C. Usually exothermic heat raised the temperature to about 120°C to 130°C. When a higher reaction temperature was required, for example 150°C for producing composition SP3 some heat had to be applied.

After the reaction with the acid the vessel was cooled to 30°C and the formaldehyde was added slowly as 37 percent formalin solution which is a 37 percent aqueous solution of formaldehyde. The mixture was stirred constantly during this addition which took place at a rate to ensure that the temperature did not rise above 50°C and preferably to maintain the temperature in the In the case of reaction at the higher temperature end of the range and in particular for Example SP3 there is a more complete sulphonation of the phenol and a relatively low free sulphuric acid content in the composition.

For the production of a phenol-formaldehyde foam according to the invention any one of the sulphonated compositions SP1 to SP15 could then be copolymerised with any one of the resoles R1 to R25 in the proportion of 1 part by weight of the sulphonated composition with from 0.2 to 8 parts by weight of the resole.

Included in the mixture were a surfactant, usually silicone oil in the proportion of 0.2 to 5.0 parts by weight per 100 parts of resin in the mixture. Suitable surfactants are the silicone oils which consist of a molecule having a dimethylpolysiloxane, to which is attached through a direct silicone to carbon linkage, a side chain consisting of polyethylene oxide and polypropylene oxide. Examples of such silicone oils are those manufactured by Union Carbide and identified as Y-6252 and L-5320. Silicone oils are especially suitable surfactants for compositions containing a high proportion of resole resin.

Non-ionic surfactants which are suitable for compositions containing a high proportion of sulphonated component are polyoxyethylene sorbitan monopalmitates and polyoxyethylene sorbitan monolaurates.

One polyoxyethylene sorbitan monopalmitate which has been used was Tween 40 manufactured by Honeywill-Atlas. Quaternary ammonium surfactants may be used.

Also included in the mixture is a foaming agent usually a low boiling point aliphatic hydrocarbon or halogenated derivative of such hydrocarbon in the proportion of 5 to 45 parts by weight per 100 parts of resin.

Foaming agents which have been employed with success are the following: $CCl_4$, $CCl_3F$, $CCl_2F_2$, $CF_2ClCFCl_2$, $C_2Cl_2F_4$, $CHCl_2F$, $CH_2Cl_2$, $CH_3Cl$, $C_4H_{12}$, $C_5H_{14}$, $C_7H_{16}$ and $C_6H_5SO_2NHNH_2$.

Particularly suitable foaming agents are $CCl_3F$, $C_2Cl_3F_3$, benzene sulphonyl hydrazide $C_6H_5.SO_2.NHNH_2$, mixtures of $CFCl_3$ and $CF_2ClCFCl_2$, and mixtures of $CFCl_3$ and $CCl_4$.

Table IV sets out proportions of resole and sulphonated phenol used for the production of some foams which have been identified as F1 to F21 and in order to provide comparative figures each of the foams F1 to F11 was produced by mixing the resole R1 of Table I with a proportion of the sulphonated phenol-formaldehyde composition SP1 of Table III. Any one of the resoles can be mixed with a proportion of any one of the sulphonated phenol compositions, at comparable viscosities, depending on the properties required for the resulting foam.

and finally the sulphonated phenol-formaldehyde composition was added and thoroughly mixed. An exothermic reaction began immediately the addition of the sulphonated composition began and generation of exothermic heat continued as the copolymerisation proceeded. The sulphonated composition in effect acts as a hardening agent for the resole and methylene group ($CH_2$) donation to the sulphonated composition was from the resole. The resole R1, being formed from a relatively high proportion of formaldehyde, has an excess of methylene groups for donation to the copolymerisation. In the case of resoles with a low proportion of formaldehyde in their constitution, and when using a relatively low proportion of resole in making the foam, there may be donation of $CH_2$ groups from another methylene group donor to assist the copolymerisation. The donor, e.g. hexamethylenetetramine as in Foam F21, may be added to the resole, to the sulphonated composition, or separately when the resole and the sulphonated composition are mixed.

The production of exothermic heat usually permitted the expansion of the blowing agent to proceed at a rate parallel with the curing of the resin mixture during the production of the crosslinked phenol-formaldehyde polymer structure. The reaction generally proceeded for about 5 minutes by which time the mixture had expanded and become hardened to produce a solid phenol-formaldehyde foam having a bulk density set out in the last column of Table IV. Additional heat may be applied in some instances to assist the foaming and curing. For example the foams F6, F10, F11, F13, F15 may be cured in an oven.

The foaming reaction can be controlled when using the more reactive resoles, for examples R23 and R24,

TABLE IV

| Foam | Resole (parts by weight) | Surfactant (parts by weight) | Blowing Agent (parts by weight) | Sulphonated Phenol (parts by weight) | Bulk Density grm. $cc^{-1}$ |
|---|---|---|---|---|---|
| F1 | R1 – 60 | 2 | 7.5 $CCl_3F$ | SP1 – 40 | 0.054 |
| F2 | R1 – 66 | 1 | 15 $C_6H_5.SO_2.NH NH_2$ | SP1 – 33 | 0.095 |
| F3 | R1 – 50 | 2 | 10 $C_2Cl_3F_3$ | SP1 – 50 | 0.053 |
| F4 | R1 – 50 | 2 | 15 $CCl_3F$ | SP1 – 50 | 0.034 |
| F5 | R1 – 15 | 3 | 10 $CCl_3F$ | SP1 – 75 | 0.051 |
| F6 | R1 – 75 | 2 | 5 $C_2Cl_3F_3$ | SP1 – 15 | 0.080 |
| F7 | R1 – 50 | 3 | 20 $CCl_3F$ | SP1 – 50 | 0.027 |
| F8 | R1 – 50 | 2 | 25 $CCl_3F$ | SP1 – 50 | 0.020 |
| F9 | R1 – 75 | 5 | 45 $CCl_3F$ | SP1 – 25 | 0.013 |
| F10 | R1 – 90 | 2 | 10 $C_2Cl_3F_3$ | SP1 – 15 | 0.090 |
| F11 | R1 – 55 | 3 | 15 $C_2Cl_3F_3$ | SP1 – 8 | 0.15 |
| F12 | R1 – 50 | 3 | 15 $CCl_3F$ | SP10 – 50 | 0.025 |
| F13 | R1 – 50 | 3 | 18 $CCl_3F$ | SP11 – 50 | 0.060 |
| F14 | R1 – 50 | 3 | 15 $CCl_3F$ | SP12 – 50 | 0.035 |
| F15 | R1 – 50 | 2 | 15 $CCl_3F$ | SP13 – 50 | 0.045 |
| F16 | R1 – 25) R9 – 25) | 2 | 15 $CCl_3F$ | SP1 – 50 | 0.06 |
| R17 | R11 – 50 | 2 | 15 $CCl_3F$ | SP1 – 50 | 0.04 |
| F18 | R10 – 45 | 2 | 15 $CCl_3F$ | SP1 – 30) SP12 – 30) | 0.04 |
| F19 | R21 – 60 | 1.5 | 6 $C_5H_{12}$ | SP14 – 20 | 0.073 |
| F20 | R21 – 6 | 2 | 10 Arcton 11 | SP14 – 60) NaOH – 2) | 0.06 |
| F21 | R22 – 10 | 1.7 | 12 Arcton 11 | SP14 – 100) Hexamethylene) tetramine - 6) | 0.06 |

In making each of the foams the surfactant was first mixed with the resole using a high-speed mixer. Then the blowing agent was added and thoroughly mixed in by reducing the reactivity of the sulphonated composition. The way in which this can be done is illustrated in Table V.

TABLE V

| Foam | Resole (parts by weight) | Surfactant (parts by weight) | Blowing Agent (parts by weight) | Sulphonated Phenol (parts by weight) | Bulk Density grm. cc$^{-1}$ |
|---|---|---|---|---|---|
| F22 | R24 – 40 | 0.6 | 12 | SP14 – 40 | 0.190 |
| F23 | R24 – 40 | 0.6 | 12 | SP14 + 8 parts NaOH per - 40 100 parts SP14 | 0.081 |
| F24 | R23 – 40 | 1 | 9 | SP14 – 40 | 0.27 |
| F25 | R23 – 40 | 1 | 9 | SP14 + 8 parts NaOH per – 40 100 parts SP14 | 0.064 |

The first two foams F22 and F23 are produced by reaction of equal parts by weight of resole R24 and sulphonated phenol SP14. In the case of the reaction producing foam F22 there was a vigorous rise but the resin had set within 40 seconds before the rise was complete owing to the high reactivity of SP14. A high foam bulk density of 0.190 grm. cc$^{-1}$ resulted.

For the production of foam F23 the sulphonated phenol was firstly treated with 8 parts of NaOH per 100 parts of the sulphonated phenol. This reduced the reactivity of the sulphonated phenol and while the mixture started to rise at room temperature, foaming was more gradual and a greater degree of expansion was achieved. Hardening was completed at 70°C giving a lighter foam of bulk density 0.081 grm. cc$^{-1}$.

Foams F24 and F25 show a similar reduction in reactivity and the production of a better foam. F24 was a high bulk density foam due to incomplete rising of the foam before rapid setting stopped further expansion.

In the case of F25 the foam did not rise at room temperature but rose at 70°C to give a foam with a very fine uniform cell structure.

It is advantageous that the conditions for preparation of the sulphonated composition and the proportions of the components be so chosen that the sulphonated composition has a viscosity of the same order as that of the resole. Because the components mixed in this final part of the process have relatively low and comparable viscosities, in the range 1 to 25 poises and preferably in the range 3 to 8 poises, a thorough and efficient mixing was possible in the mixing head of conventional foam processing equipment. The closely comparable viscosities of the components permit close control of the foam production. It has been found that the two resin materials premixed with a proportion of surfactant for example 5 parts by weight per 100 parts of resin could be accurately metered into the mixing head of a foam dispensing machine. The foaming agent was introduced either as a premixture with the resole component or directly into the mixing head. All the ingredients become homogenised in the mixing head giving a resulting cream-like material which is then processed to permit a crosslinking reaction to proceed and the parallel foaming reaction resulting in the desired celluloar phenol-formaldehyde material.

The cream-like material from the mixing head was poured into moulds and allowed to expand in the mould to produce billets or slab stock or slabs or panels, for example for use as building insulation materials.

In a continuous process the cream-like material was dispensed from the mixing head on to a continuously moving conveyor belt and was subjected to thermal conditions while advanced on the belt to permit the foaming reaction to proceed. The cellular material produced was then guillotined and cut to size.

In other continuous processes the cream-like material could be extruded through an orifice to produce a ribbon or strip of continuous or interrupted length or to produce a rod or tube or bar of desired cross-section.

The cellular material could be used for producing shaped units by injection into contoured moulds which units were for packaging or display purposes.

In another application the cream-like material was introduced between one or more substrates to produce a laminated board or panel. Further the material could be permitted to foam around or between inserts to join or separate other materials in composite structures.

The density of the cellular material can be varied by varying the ingredients, and the amount and type of foaming agent as well as the type of surfactant determines the cell size. The foam material may be coloured by addition of suitable dyes in the final mixing stage and may incorporate inorganic or organic filler materials for example inorganic fillers such as diatomaceous earth or a material to modify the resilience of the foam. Strengthening materials such as glass beads, glass fibres, e.g. in the form of wool or tissue or mat, or glass flake may be embodied in the foam at the final mixing stage.

Usually the major part, that is at least 80 percent, of the resin material is formed from the resole and sulphonated composition. A third resin or other additive may be included in the material, being blended with either the resole or the sulphonated composition prior to their admixture, or being added in the mixing head. A small proportion of a resin or other material which modifies the resilience of the foam may be added in this way.

The cellular phenol-formaldehyde resin material produced by the method of the invention has been found to have good insulating properties both thermal and acoustic and good fire resistance.

A simple flame penetration test was carried out with each of the foams set out in Table IV and the test involved the direct impingement of a burner flame on a test specimen foam. Small blocks of each foam measuring 20 cm by 20 cm by 2.5 cm were mounted on a stand so that they were 5 cm from a burner head. The duration of the test was the time interval between the lighting of the burner and emergence of the flame through the upper surface of the test specimen. This was found to correspond to an upper surface temperature greater than 250°C. For example, foam F4 which has a density of 0.034 grm. cc$^{-1}$ has an endurance time of 17 minutes 30 seconds.

A conventional acid-catalysed resole foam of the same density of 0.034 grm. cc$^{-1}$ has an endurance time of 2 minutes 5 seconds under the same test. This test showed that the foams according to the invention provide a most efficient barrier to flame penetration due to the formation of a stable carbonaceous char when subjected to direct flame. The new foams were self-extinguishing within seconds of removing a flame.

Earlier phenol-formaldehyde resin foams do not exhibit self-extinguishing properties but were found to continue to glow and to be consumed for a matter of minutes after removal of a flame from the material.

The new phenolic foams according to the invention thus provide a more efficient barrier to flame spread or penetration than has been achieved with any of the conventional materials. The materials have excellent antipunking properties and are very stable under high temperature conditions. For example foam F4 has a safe maximum service temperature of 201°±5°C. Conventional acid-catalysed phenolic foams are usually unstable at temperatures above 113°±3°C.

The new cellular materials have good acoustic and thermal insulation properties. The thermal conductivity varies according to the density and typically for a solid resin foam according to the invention having a density of 0.032 grm. $cc^{-1}$, the thermal conductivity measured at 25°C is 0.028 kcal. cm/cm².h.°C.

The use of the sulphonated phenol-formaldehyde resin which is a water soluble product, as a hardening agent for the phenol-formaldehyde resole either alone or in some circumstances with addition of a formaldehyde donor, results in a cheaper, more fire retardant product than conventional phenolic foam materials.

We claim:

1. A solid fire-retardant phenol-formaldehyde resin foam produced by reacting a first composition with a resole in the presence of a surfactant and a foaming agent, said first composition acting as a hardener for said resole and being produced by reacting a phenol with concentrated sulphuric acid in the ratio 0.8 to 1.5 moles of sulphuric acid per mole of the phenol and then adding per mole of the phenol a quantity of formaldehyde in the range having a lower limit of 0.3 mole and an upper limit of 0.8 mole when using 0.8 mole of sulphuric acid and decreasing to 0.5 mole when using 1.5 moles of sulphuric acid; said resole being produced by reacting a phenol and formaldehyde in the ratio of at least 0.9 mole of formaldehyde per mole of the phenol in the presence of a basic catalyst.

2. A phenol-formaldehyde resin foam according to claim 1, wherein the surfactant is a silicone oil and is present in the proportion 0.2 to 5.0 parts by weight per 100 parts of resin.

3. A resin foam according to claim 1, wherein the silicone oil surfactant is present in the proportion 0.5 to 2.0 parts by weight per 100 parts of resin.

4. A resin foam according to claim 1, wherein the foaming agent is a low boiling point liquid which is vaporised by exothermic heat generated in the reaction of the composition with the resole, and is present in the proportion 5 to 45 parts by weight per 100 parts of resin.

5. A resin according to claim 4, wherein the foaming agent is selected from low boiling point aliphatic hydrocarbons and halogenated derivatives thereof.

6. A resin foam according to claim 5, wherein the foaming agent consists of one or more compounds selected from the group consisting of $CCl_4$, $CCl_3F$, $CCl_2F_2$, $CF_2ClCFCl_2$, $C_2Cl_2F_4$, $CHCl_2F$, $CH_2Cl_2$, $CH_3Cl$, $C_5H_{12}$, $C_6H_{14}$, $C_7H_{16}$ and $C_6H_5SO_2NHNH_2$.

* * * * *